(12) United States Patent
Li et al.

(10) Patent No.: US 6,641,302 B2
(45) Date of Patent: Nov. 4, 2003

(54) THERMAL PROCESS APPARATUS FOR A SEMICONDUCTOR SUBSTRATE

(75) Inventors: Yicheng Li, Kanagawa (JP); Takashi Shigeoka, Nirasaki (JP); Takeshi Sakuma, Kanagawa (JP)

(73) Assignee: Tokyo Electron Limited, Tokyo (JP)

( * ) Notice: Subject to any disclaimer, the term of this patent is extended or adjusted under 35 U.S.C. 154(b) by 49 days.

(21) Appl. No.: 09/962,851

(22) Filed: Sep. 26, 2001

(65) Prior Publication Data

US 2002/0041620 A1 Apr. 11, 2002

(30) Foreign Application Priority Data

Sep. 26, 2000 (JP) ........................................ 2000-293023

(51) Int. Cl.⁷ .................................................. G01J 5/00
(52) U.S. Cl. ........................ 374/130; 374/126; 374/121
(58) Field of Search ................................. 374/130, 126, 374/131, 161, 121, 141; 392/416

(56) References Cited

U.S. PATENT DOCUMENTS

| 5,226,732 | A | * | 7/1993 | Nakos et al. ................ 374/126 |
| 5,624,590 | A | * | 4/1997 | Fiory ........................ 219/390 |
| 5,628,564 | A | * | 5/1997 | Nenyei et al. ............. 374/126 |
| 5,660,472 | A | * | 8/1997 | Peuse et al. ................ 374/126 |
| 5,823,681 | A | * | 10/1998 | Cabib et al. ................ 374/126 |
| 6,007,241 | A | * | 12/1999 | Yam et al. .................. 374/130 |
| 6,127,658 | A | * | 10/2000 | Kohav ........................ 392/416 |
| 6,179,466 | B1 | * | 1/2001 | Peuse et al. ................ 374/128 |
| 6,200,634 | B1 | * | 3/2001 | Johnsgard et al. .......... 374/126 |
| 6,259,072 | B1 | * | 7/2001 | Kinnard et al. ............. 219/486 |
| 6,293,696 | B1 | * | 9/2001 | Guardado .................... 374/126 |
| 6,375,350 | B1 | * | 4/2002 | Stein .......................... 374/126 |
| 6,488,407 | B1 | * | 12/2002 | Kitamura et al. ........... 374/126 |
| 2001/0006530 | A1 | * | 7/2001 | Adams et al. .............. 374/131 |
| 2001/0038005 | A1 | * | 11/2001 | Hauf .......................... 374/130 |
| 2002/0020696 | A1 | * | 2/2002 | Kitamura et al. ........... 374/130 |
| 2002/0048311 | A1 | * | 4/2002 | Norrbakhsh et al. ........ 374/141 |

\* cited by examiner

*Primary Examiner*—Diego Gutierrez
*Assistant Examiner*—Mirellys Jagan
(74) *Attorney, Agent, or Firm*—Pillsbury Winthrop LLP

(57) ABSTRACT

A thermal process apparatus for a semiconductor substrate, including a heating source heating the semiconductor substrate by irradiating a light on one side of the semiconductor substrate, a reflection plate facing to the semiconductor substrate in a state where a reflection cavity is formed with another side of the semiconductor substrate, a thermometer having a light-receiving part provided on the refection plate so as to measure a temperature of the semiconductor substrate by catching a radiation beam from the semiconductor substrate heated by the heating source by the light-receiving part; and light absorption means provided around the light-receiving part for absorbing a diffuse reflection light generated in the reflection cavity.

6 Claims, 7 Drawing Sheets

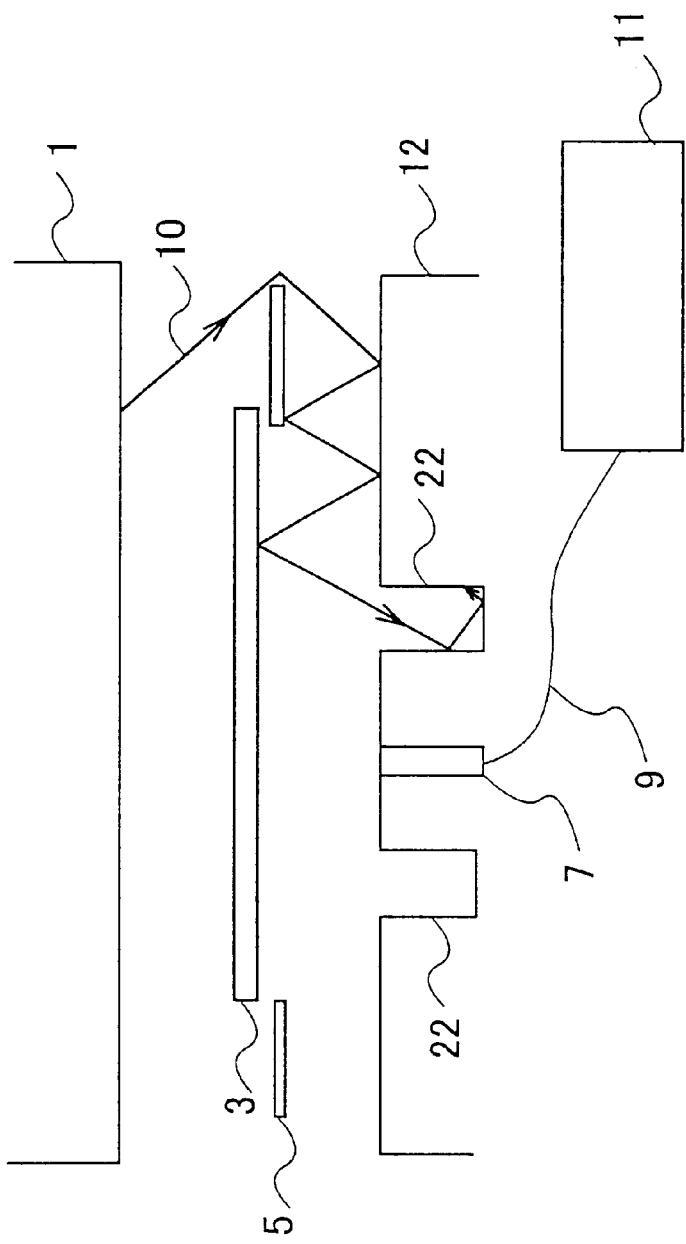

THERMAL PROCESS APPARATUS FOR A SEMICONDUCTOR SUBSTRATE

BACKGROUND OF THE INVENTION

1. Field of the Invention

The present invention generally relates to thermal process apparatuses for semiconductor devices, and more particularly, to a thermal process apparatus for a semiconductor substrate which can be used for measuring of a temperature as to a semiconductor substrate with high precision.

2. Description of the Related Art

FIG. 1 is a view showing a structure of a conventional rapid thermal process apparatus which is used as a chemical vapor deposition (CVD) apparatus or an annealing apparatus for manufacturing a semiconductor integrated circuit. As shown in FIG. 1, the rapid thermal process apparatus includes a heating source 1, a guard ring 5, a quartz rod 7, an optical fiber 9 and a radiation thermometer 11. The heating source 1 includes a halogen lamp. The guard ring 5 supports a wafer 3 which is an object for heating process. The quartz rod 7 is provided in a bottom plate 8. The optical fiber 9 transmits a radiation beam radiated from the wafer 3 and detected by the quartz rod 7. The radiation thermometer 11 is connected with the optical fiber 9.

With the above-mentioned structure of the rapid thermal process apparatus, the wafer 3 supported by the guard ring 5 is heated by the radiation beam radiated from the halogen lamp. The wafer 3 is heated from a room temperature to for instance 1000° C., with a rate of 100° C./sec for instance.

The radiation beam radiated from the wafer 3 is detected by the quartz rod 7. The temperature of the wafer 3 is detected by the radiation thermometer 11 on the basis of the detected beam.

However, the conventional rapid thermal process apparatus having the above-mentioned structure has disadvantages. That is, the temperature of the wafer 3 is detected based on the radiation beam detected by the quartz rod 7. Therefore, as shown in FIG. 1, a stray light 10, which is a part of the radiation beam radiated from the heating source 1, may be incident on the quartz rod 7. That is, the stray light 10 may be reflected multiply between the wafer 3 and the bottom plate 8 and may be incident on the quartz rod 7. As a result, a light other than the radiation beam radiated from the wafer 3 is also detected by the quartz rod 7. This causes a problem in that it is not possible to detect the temperature of the wafer 3 reliably.

Also, an area of the multiple reflection of the stray light is not fixed. Hence, it is not possible to make an accurate correction formula for a radiation ratio.

SUMMARY OF THE INVENTION

Accordingly, it is a general object of the present invention is to provide a novel and useful thermal process apparatus for a semiconductor substrate in which one or more of the problems described above are eliminated.

Another and more specific object of the present invention is to provide a thermal process apparatus for a semiconductor substrate which can be used for measuring a temperature of a semiconductor substrate with high accuracy.

The above objects of the present invention are achieved by a thermal process apparatus for a semiconductor substrate, including a heating source heating the semiconductor substrate by irradiating a light on one side of the semiconductor substrate, a reflection plate facing to the semiconductor substrate in a state where a reflection cavity is formed with another side of the semiconductor substrate, a thermometer having a light-receiving part provided on the refection plate so as to measure a temperature of the semiconductor substrate by catching a radiation beam from the semiconductor substrate heated by the heating source by the light-receiving part; and light absorption means provided around the light-receiving part for absorbing a diffuse reflection light generated in the reflection cavity.

According to the above invention, it is possible to absorb the diffuse reflection light, namely a stray light, by the light absorption means, prior to the light being incident on the light-receiving part of the thermometer. Hence, it is possible to avoid that the diffuse reflection light is incident on the temperature measure means.

The light absorption means may include a concave part forming a black body, so that the diffuse reflection light can be absorbed effectively.

The concave part may have an opening width whose value is greater than $D*\tan\theta$, where $\sin\theta$ is defined as a numerical aperture in a vacuum when the light-receiving part catches the light and D is defined as a distance between the concave part and the semiconductor substrate. The concave part may have an opening whose cross sectional configuration is a triangle, a quadrilateral, a hexagonal, or any other polygon. In this case, the opening configuration is regarded as a circle, thereby its opening width is calculated as described above.

The concave part may be provided in a distance of an even number multiple of $D*\tan\theta$ from the light-receiving part, where $\sin\theta$ is defined as a numerical aperture in a vacuum when the light-receiving part catches the light and D is defined as a distance between the concave part and the semiconductor substrate.

The concave part may be provided in a distance of $r/\tan\theta$ and under the semiconductor substrate, where $\sin\theta$ is defined as a numerical aperture in a vacuum when the light-receiving part catches the light and r is defined as a value of a radius of an opening of the light-receiving part.

Furthermore, the light absorption means may include a groove having a designated radius and depth, so that the diffuse reflection light can be confined in the groove. Hence, it is possible to avoid that the diffuse reflection light is incident on the light-receiving part.

Also, the light absorption means may include a projection body having a groove, a distance between the top surface of the projection body and the semiconductor substrate being smaller than a distance between the light-receiving part and the semiconductor substrate.

Other objects, features, and advantages of the present invention will be more apparent from the following detailed description when read in conjunction with the accompanying drawings.

BRIEF DESCRIPTION OF THE DRAWINGS

FIG. 6 is a view showing a structure of a rapid thermal process apparatus according to a second embodiment of the present invention;

DETAIL DESCRIPTION OF THE PREFERRED EMBODIMENTS

Figure 1:
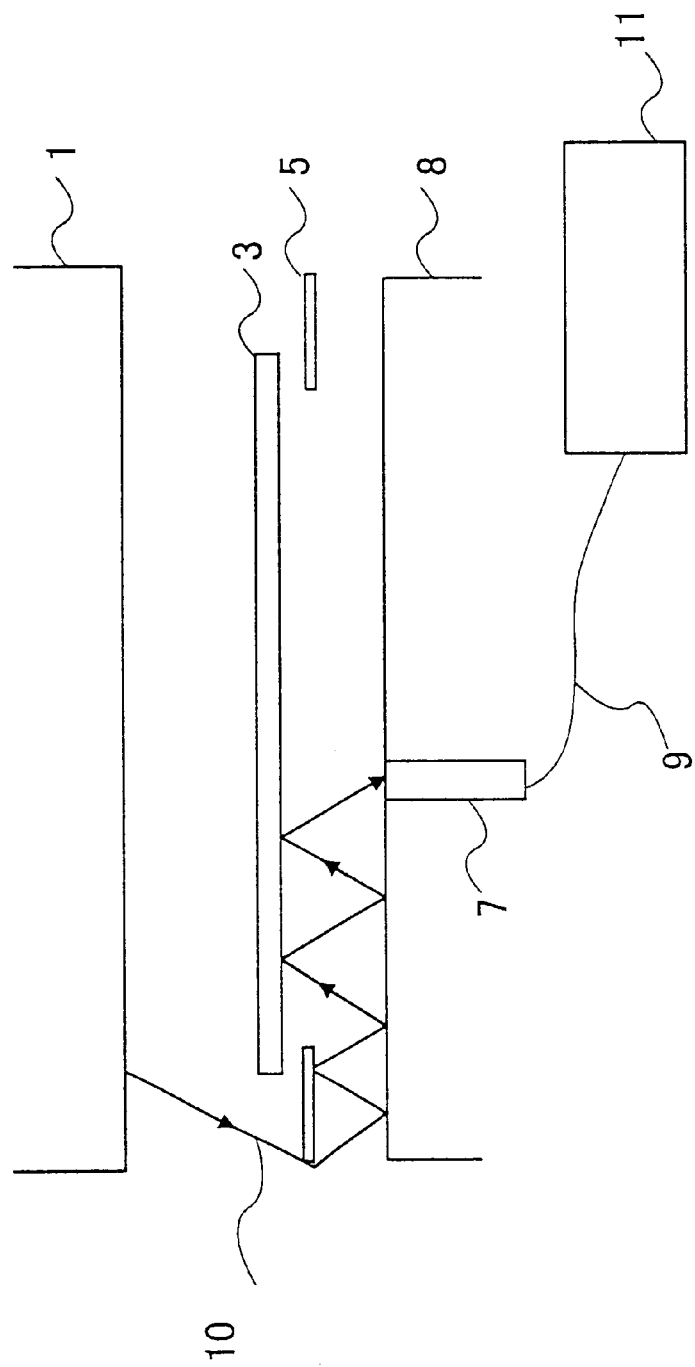
FIG. 1 is a view showing a structure of a conventional rapid thermal process apparatus.

A description will now be given, with reference to the drawings, of embodiments of the present invention. In respective figures, parts that are the same or substantially the same as the parts shown in other figures are given the same reference numerals.

Figure 2:
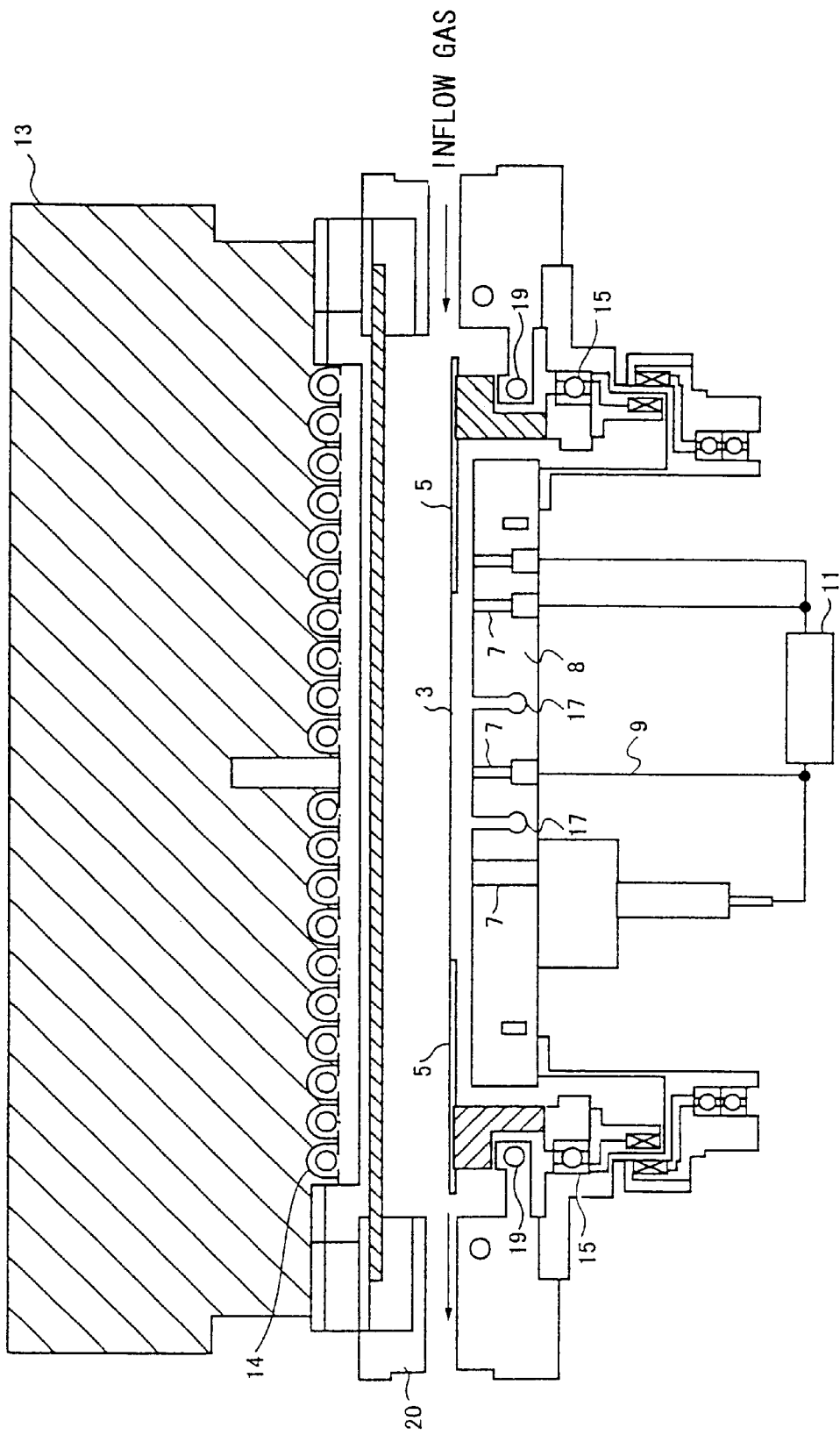
FIG. 2 is a cross-sectional view showing a structure of a rapid thermal process apparatus according to a first embodiment of the present invention.

FIG. 2 is a cross-sectional view showing a structure of a rapid thermal process apparatus according to the first embodiment of a present invention. Referring to FIG. 2, the rapid thermal process apparatus according to the first embodiment includes halogen lamps 14, a halogen lamp house 13, a chamber 20 for heat-processing a wafer 3, and a radiation thermometer 11. The halogen lamp house 13 controls an electric power supplied to the halogen lamps 14.

As a means for heating the wafer 3, instead of the above-mentioned lamp, a resistance heating source, which generates a heat by supplying an electric current to a resistor, can be used in the rapid thermal process apparatus.

The chamber 20 includes a guard ring 5, a bearing 15, a bottom plate 8, quartz rods 7, a cooling part 19, and concave parts 17. The guard ring 5 supports the wafer 3 and is made of silicon carbide. The bearing 15 allows the guard ring 5 on which the wafer 3 is provided to rotate. The quartz rods 7 are provided in the bottom plate 8 and detect a radiation beam radiated from the wafer 3. The cooling part 19 cools the bottom plate 8. The concave parts 17 are provided in the bottom plate 8. The quartz rods 7 are connected with the radiation thermometer 11 by optical fibers 9. Inside of the chamber 20 is evacuated.

As described above, the rapid thermal process apparatus according to the first embodiment includes the concave parts 17 around the quartz rods 7 so as to absorb a stray light 10, which may incident on the quartz rods 7 from any gaps in the rapid thermal process apparatus while reflecting multiply between the wafer 3 and the bottom plate 8.

That is, it is preferable that only the radiation beam radiated from the wafer 3 is incident on the quartz rods 7, as described above, in order to measure an accurate temperature of the wafer 3. Therefore, in this embodiment, the stray light 10 caused by a light radiated from the halogen lamps 14, is absorbed by the concave parts 17, so that it is possible to improve an accuracy of measurement of the temperature of the wafer 3.

Furthermore, in the rapid thermal process apparatus according to the first embodiment, the electric power supplied to the halogen lamps 14 is controlled by the halogen lamp house 13 based on the temperature of the wafer 3 measured by the radiation thermometer 11. As a result of this, a degree of heating the wafer 3 is controlled. Hence, it is possible to improve an accuracy of measurement of the heating temperature in the rapid thermal process apparatus by improving an accuracy of measurement of the temperature of the wafer 3.

Figure 3:
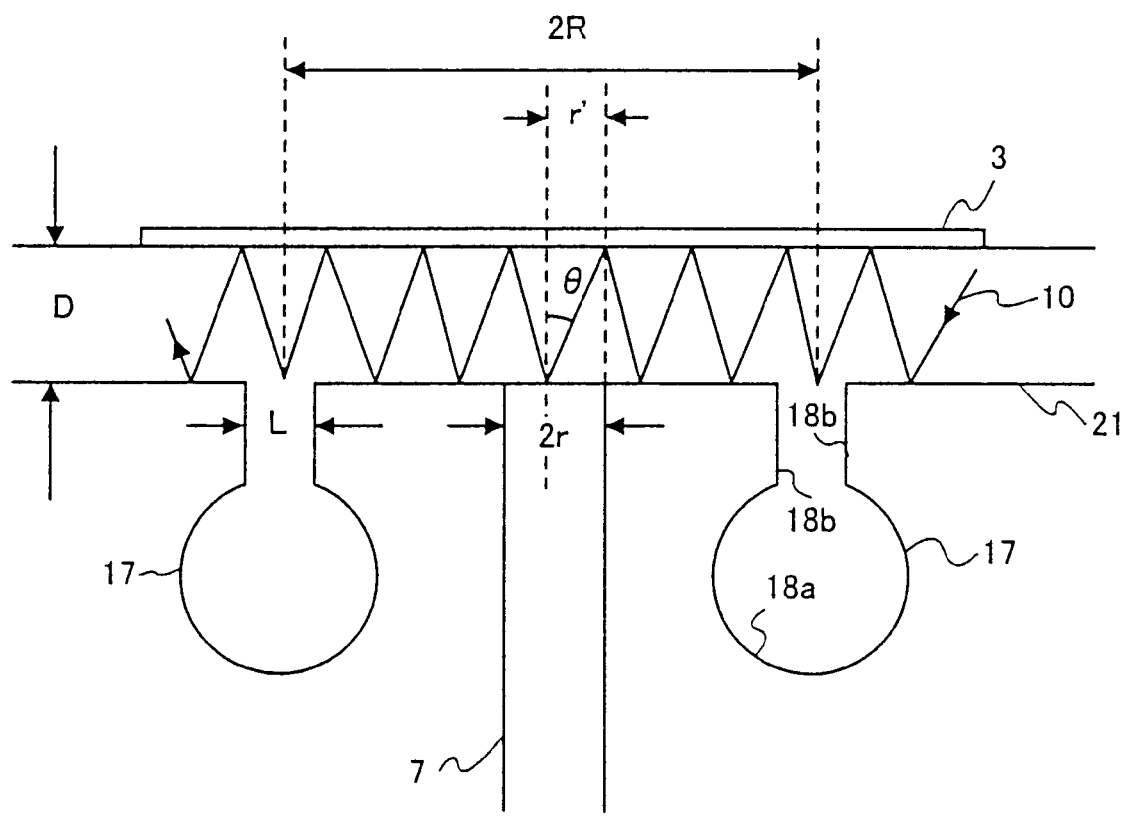
FIG. 3 is a view showing a structure of a concave part shown in FIG. 2.

Now, the concave part 17 will be explained more in detail. FIG. 3 is a view showing a structure of the concave part 17 shown in FIG. 2. As shown in FIG. 3, an inside curve surface 18a of the concave part 17 is processed by a black hard anodized aluminum process. A groove surface 18b is polished process as well as a surface 21 of the bottom plate 8.

Referring to FIG. 3, "r" indicates a radius of the quartz rod 7. "θ" indicates a critical angle of the quartz rod 7. "Sin θ" indicates a numerical aperture of the quartz rod 7. "D" indicates a distance between the wafer 3 and the bottom plate 8. "R" indicates a distance between a center of the quartz rod 7 and a center of the concave part 17. "L" indicates a width of an opening part of the concave part 17, namely an opening width.

Figure 4:
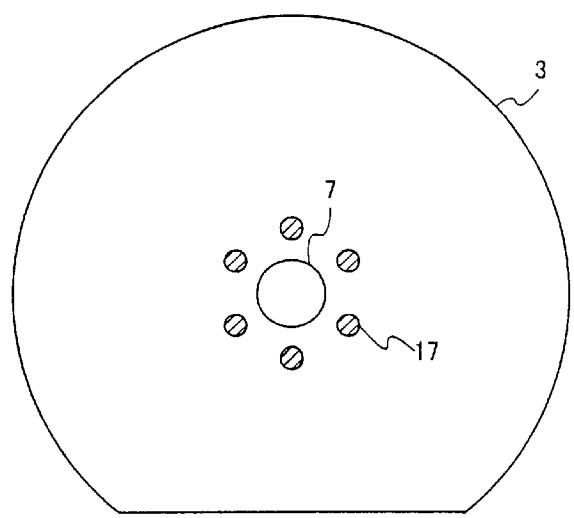
FIG. 4 is a first plan showing an arrangement of a concave part shown in FIG. 2.
Figure 5:
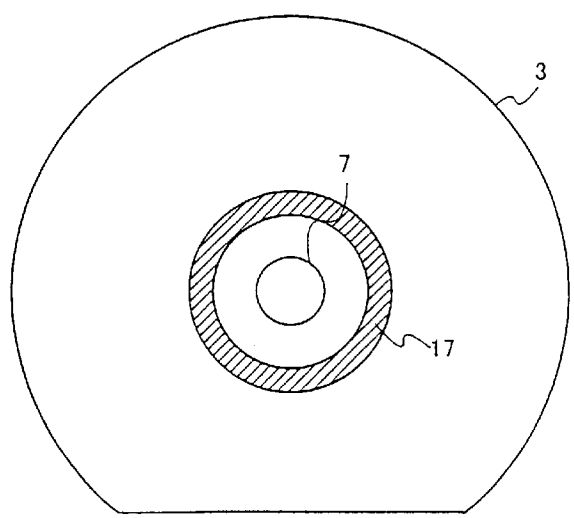
FIG. 5 is a second plan showing an arrangement of a concave part shown in FIG. 2.

The concave parts 17 described above may be dotted around the quartz rod 7 as shown in FIG. 4. Also, the concave part 17 as described above may be provided around the quartz rod 7 like a doughnut shape as shown in FIG. 5.

For the purpose of an effective absorption of the stray light 10, a value of the distance "D" may be equal to or less than a value of r/tan θ calculated by the radius "r" of the quartz rod 7 and the above-mentioned "θ". Furthermore, "R" may have a value of a multiple of a natural number as to "r'" shown in FIG. 3, namely a value of n*r' which is a value of n*D*tan θ, preferably. "R" may also have a value greater than a value of (r+L/2), preferably. Furthermore, the above-mentioned "L" may have a bigger value of 2D tan θ preferably.

If "L" has a value greater than 2D tanθ, the stray light 10, which may enter the quartz rods 7 due to the multiple reflection, can be absorbed by the concave parts 17, irrespective of a value of "R". In case of that 2Dtan θ is used as a value of "L", it is effective that n*D*tan θ, in which "n" is a natural number, is used as "R". The smaller the value of "n" is, namely the shorter the distance between the concave part 17 and the quartz rod 7 is, the higher the measurement accuracy as to the temperature of the wafer 3 on the basis of the light caught by the quartz rod 7 is.

Thus, according to the radiation thermometer in the first embodiment of the present invention, the stray light, which is incident on the quartz rod 7 as a kind of noise, is absorbed by the concave parts 17, before being incident on the quartz rod 7. Therefore, it is possible to improve the accuracy of the measurement as to the temperature of the wafer 3 by using the radiation thermometer 11.

FIG. 6 is a view showing a structure of a rapid thermal process apparatus according to a second embodiment of the present invention. As shown in FIG. 6, the rapid thermal process apparatus of the second embodiment includes a heating source 1, a guard ring 5, a bottom plate 12, a quartz rod 7, a radiation thermometer 11, and an optical fiber 9, similar to the rapid thermal process apparatus of the first embodiment. The heating source 1 includes a lamp, a resistor, or the like. The quartz rod 7 is provided in the bottom plate 12. The optical fiber 9 connects the quartz rod 7 with the radiation thermometer 11.

In the rapid thermal process apparatus of the second embodiment, a groove 22 is formed near the quartz rod 7 in the bottom plate 12. The groove 22 has a designated opening width and depth.

The opening width and position in the bottom plate 12 as to the groove 22 are decided, in a similar manner as the concave part 17 in the first embodiment of the present invention.

That is, if that the opening width of the groove has a bigger value than 2D tan θ, the stray light 10 which may enter the quartz rod 7 due to the multiple reflection, can be confined in the groove 22, no matter where the groove 22 locates in the bottom plate 12. In a case where 2Dtan θ is used as a value of the opening width, it is effective that n*D*tan θ is used as a value of the distance between the groove 22 and the quartz rod 7. The smaller the value of "n" is, namely the shorter the distance between the groove 22 and the quartz rod 7 is, the higher the measurement precision as to the temperature of the wafer 3 on the basis of the light caught by the quartz rod 7 is. Besides, the longer the depth of the groove 22 is, the higher the degree of certainty as to confining the stray light 10 in the groove 22 is.

Figure 7A:
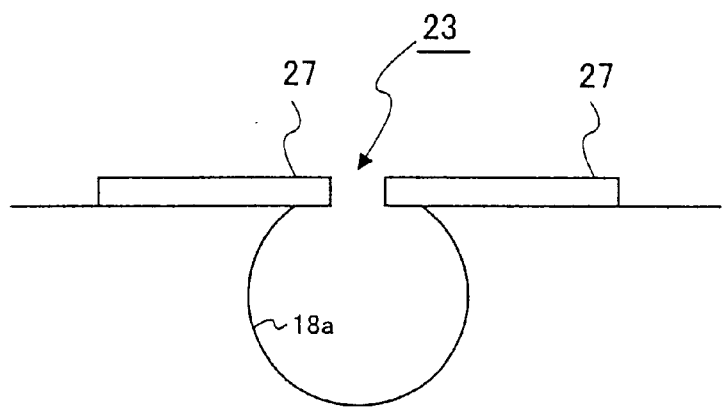
FIG. 7A is a view showing a second example of a structure of a groove shown in FIG. 6.
Figure 7B:
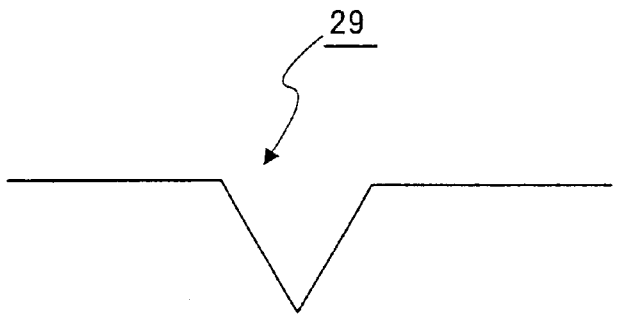
FIG. 7B is a view showing a third example of a structure of a groove shown in FIG. 6.

FIG. 7A is a view showing a second example of a structure of a groove shown in FIG. 6. FIG. 7B is a view showing a third example of a structure of a groove shown in FIG. 6.

A concave part 23 shown in FIG. 7A may be formed instead of the groove 22. The concave part 23 includes a concave having an inside curve surface 18a and an aluminum reflection plate 27. The inside curve surface 18a is processed by a black hard anodized aluminum process. The aluminum reflection plate 27 is used for improving a reflection ratio on an upper part of the concave. With the above-mentioned structure, a stray light can be absorbed by the concave effectively.

A groove 29 having a V-shape shown in FIG. 7B, instead of the groove 22, may be formed on the bottom plate. The groove 22 and the groove 29 have advantages in that they are formed and pressed easily.

Figure 8:
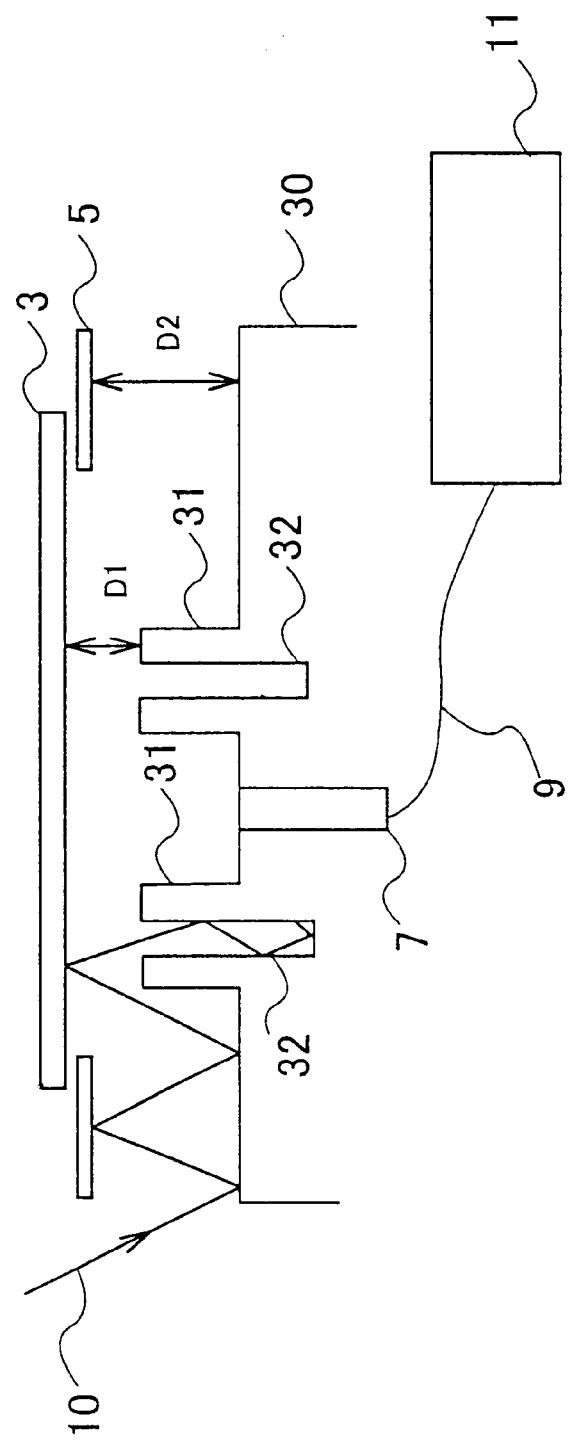
FIG. 8 is a view showing a structure of a rapid thermal process apparatus according to a third embodiment of the present invention.

FIG. 8 is a view showing a structure of a rapid thermal process apparatus according to a third embodiment of the present invention. As shown in FIG. 8, the rapid thermal process apparatus of the third embodiment has almost the same structure as the rapid thermal process apparatus of the second embodiment shown in FIG. 6. The rapid thermal process apparatus of the third embodiment is different from that of the second embodiment in that a projection body 31 like a bank is provided on the bottom plate 30 and near the quartz rod 7. A groove 32 is formed between respective projection bodies 31. As shown in FIG. 8, "D1" is defined as a shortest distance between the projection body 31 and the wafer 3, and "D2" is defined as a shortest distance between the guard ring 5 and the bottom plate 30. In a structure shown in FIG. 8, "D1" is set to be a smaller value than "D2".

With the above-mentioned structure, it is possible to reduce the distance D shown in FIG. 3 substantially by providing the projection body 31. Hence, a smallest value of the opening width L, calculated as 2Dtan θ, may also be reduced. Therefore, as shown in FIG. 8, it is possible to achieve the same advantage as the advantage achieved by the concave part 17 in the first embodiment 1, by forming the groove 32 having a width, which is a bigger value than the smallest value, on the projection body 31. In this embodiment, the longer the depth of the groove 32 is, the higher the degree of certainty of confining the stray light 10 in the groove 32 is, as well as in the second embodiment. The projection body 31 may be formed not only near the quartz rod 7 but also on a lower part of the guard ring 5.

As described above, since the rapid thermal process apparatus of the third embodiment includes the projection body 31 having the groove 32, it has same advantages as the rapid thermal process apparatuses of the first and second embodiments. Besides, the rapid thermal process apparatus of the third embodiment has a further advantage in that the projection body 31 can be easily formed on the bottom plate 30 as compared with the concave part 17 shown in FIG. 3.

The present invention is not limited to these embodiments, but various variations and modifications may be made without departing from the scope of the present invention.

This patent application is based on Japanese priority patent application No. 2000-293023 filed on Sep. 26, 2001, the entire contents of which are hereby incorporated by reference.

What is claimed is:

1. A thermal process apparatus for a semiconductor substrate, comprising:

a heating source heating the semiconductor substrate by irradiating a light on one surface of the semiconductor substrate;

a reflection plate facing an opposite surface of the semiconductor substrate in a state where a reflection cavity is formed with the opposite surface of the semiconductor substrate;

a thermometer having a light-receiving part provided in the reflection plate so as to measure a temperature of the semiconductor substrate by catching a radiation beam from the semiconductor substrate heated by the heating source; and a light absorbing structure provided around the light-receiving part configured to absorb a diffuse reflection light generated in the reflection cavity, wherein the light absorbing structure comprises a concave part forming a black body, and the concave part has an opening width whose value is greater than 2D*tan θ, where θ is defined as a value of a critical angle of the light receiving part, sin θ is defined as a numerical aperture in a vacuum when the light-receiving part catches the light, and D is defined as a distance between the reflection plate and the semiconductor substrate.

2. A thermal process apparatus for a semiconductor substrate, comprising:

a heating source heating the semiconductor substrate by irradiating a light on one surface of the semiconductor substrate;

a reflection plate facing an opposite surface of the semiconductor substrate in a state where a reflection cavity is formed with the opposite surface of the semiconductor substrate;

a thermometer having a light-receiving part provided in the reflection plate so as to measure a temperature of the semiconductor substrate by catching a radiation beam from the semiconductor substrate heated by the heating source; and a light absorbing structure provided around the light-receiving part configured to absorb a diffuse reflection light generated in the reflection cavity, wherein the light absorbing structure comprises a concave part forming a black body, and the concave part is provided at a distance of a natural number multiple of D*tan θ from the light-receiving part, where θ is defined as a value of a critical angle of the light receiving part, sin θ is defined as a numerical aperture in a vacuum when the light-receiving part catches the light, and D is defined as a distance between the reflection plate and the semiconductor substrate.

3. A thermal process apparatus for a semiconductor substrate, comprising:

a heating source heating the semiconductor substrate by irradiating a light on one surface of the semiconductor substrate;

a reflection plate facing an opposite surface of the semiconductor substrate in a state where a reflection cavity is formed with the opposite surface of the semiconductor substrate;

a thermometer having a light-receiving part provided in the reflection plate so as to measure a temperature of the semiconductor substrate by catching a radiation beam from the semiconductor substrate heated by the heating source; and a light absorbing structure provided around the light-receiving part configured to absorb a diffuse reflection light generated in the reflection cavity, wherein the light absorbing structure comprises a concave part forming a black body, and the concave part is provided at a distance of r/tan θ under the semiconductor substrate, where θ is defined as a value of a critical angle of the light receiving part, sin θ is defined as a numerical aperture in a vacuum when the light-receiving part catches the light and r is defined as a value of a radius of an opening in the light-receiving part.

4. A thermal process apparatus for a semiconductor substrate, comprising:

a heating source heating the semiconductor substrate by irradiating a light on one surface of the semiconductor substrate;

a reflection plate facing to an opposite surface of the semiconductor substrate in a state where a reflection cavity is formed with the opposite surface of the semiconductor substrate;

a thermometer having a light-receiving part provided in the reflection plate so as to measure a temperature of the semiconductor substrate by catching a radiation beam from the semiconductor substrate heated by the heating source; and a light absorbing structure provided around the light-receiving part configured to absorb a diffuse reflection light generated in the reflection cavity, wherein the light absorbing structure comprises a groove having a designated width and depth, and the groove has an opening width whose value is greater than 2D*tan θ, where θ is defined as a value of a critical angle of the light receiving part, sin θ is defined as a numerical aperture in a vacuum when the light-receiving part catches the light, and D is defined as a distance between the reflection plate and the semiconductor substrate.

5. A thermal process apparatus for a semiconductor substrate, comprising:

a heating source heating the semiconductor substrate by irradiating a light on one surface of the semiconductor substrate;

a reflection plate facing to an opposite surface of the semiconductor substrate in a state where a reflection cavity is formed with the opposite surface of the semiconductor substrate;

a thermometer having a light-receiving part provided in the reflection plate so as to measure a temperature of the semiconductor substrate by catching a radiation beam from the semiconductor substrate heated by the heating source; and a light absorbing structure provided around the light-receiving part configured to absorb a diffuse reflection light generated in the reflection cavity, wherein the light absorbing structure comprises a groove having a designated width and depth, and the groove is provided at a distance of a natural number multiple of D*tan θ from the light receiving part, where θ is defined as a value of a critical angle of the light receiving part, sin θ is defined as the numerical aperture in a vacuum when the light-receiving part catches the light, D is defined as a distance between the reflection plate and the semiconductor substrate.

6. A thermal process apparatus for a semiconductor substrate comprising:

a heating source heating the semiconductor substrate by irradiating a light on one surface of the semiconductor substrate;

a reflection plate facing to an opposite surface of the semiconductor substrate in a state where a reflection cavity is formed with the opposite surface of the semiconductor substrate;

a thermometer having a light-receiving part provided in the reflection plate so as to measure a temperature of the semiconductor substrate by catching a radiation beam from the semiconductor substrate heated by the heating source; and a light absorbing structure provided around the light-receiving part configured to absorb a diffuse reflection light generated in the reflection cavity, wherein the light absorbing structure comprises a groove having a designated width and depth, and the groove is provided at a distance of r/tan θ under the semiconductor substrate, where θ is defined as a value of a critical angle of the light receiving part, sin θ is defined as a numerical aperture in a vacuum when the light-receiving part catches the light, and r is defined as a value of a radius of an opening of the light receiving part.

* * * * *